United States Patent [19]

May et al.

[11] Patent Number: 5,197,782
[45] Date of Patent: Mar. 30, 1993

[54] APPARATUS INCLUDING A VEHICLE AND A CONTAINER FOR USE IN HAULING AND DUMPING MATERIAL

[75] Inventors: Robert A. May; Patrick T. Earp, both of Beeville, Tex.

[73] Assignee: May Fabricating Company, Beeville, Tex.

[21] Appl. No.: 725,982

[22] Filed: Jul. 5, 1991

[51] Int. Cl.⁵ .............................................. B60P 1/26
[52] U.S. Cl. .................................. 298/23 M; 49/340; 298/22 R; 298/23 R
[58] Field of Search ............ 298/23 MD, 23 S, 23 R, 298/23 M, 23 D, 23 DF, 22 R, 18, 17.5, 23 B; 296/57 R; 49/340

[56] References Cited

U.S. PATENT DOCUMENTS

| | | | |
|---|---|---|---|
| 2,261,745 | 11/1941 | Sand | 298/23 B |
| 2,868,583 | 1/1959 | Harbers et al. | 298/23 M |
| 2,943,753 | 7/1960 | Keys | 298/23 R |
| 3,379,475 | 4/1968 | Holland | 298/23 B |
| 3,404,918 | 10/1968 | Lackey | 298/23 M |
| 3,811,729 | 5/1974 | Vornberger | 298/23 M |
| 4,068,769 | 1/1978 | Sweet et al. | 298/23 M |
| 4,076,310 | 2/1978 | Schwalm | 298/23 M |
| 4,194,787 | 3/1980 | Williamsen | 298/23 M |

Primary Examiner—Michael S. Huppert
Assistant Examiner—Janice Krizek
Attorney, Agent, or Firm—Vaden, Eickenroht, Thompson, Boulware & Feather

[57] ABSTRACT

There is disclosed an apparatus which includes a vehicle and a container supported on the bed of the vehicle for use in hauling and dumping material. The bed of the vehicle is tiltable and the container has a gate for closing an open end of the container, when the bed is flat, and permitting the gate to move to open position when the container is tilted with bed. The gate is latched in closed position in response to an actuator on the vehicle.

11 Claims, 6 Drawing Sheets

APPARATUS INCLUDING A VEHICLE AND A CONTAINER FOR USE IN HAULING AND DUMPING MATERIAL

FIELD OF THE INVENTION

This invention relates generally to apparatus including a vehicle and a container for use in hauling and dumping material. More particularly, it relates to improvements in apparatus of this type wherein the container is of the intermodal type which permits the contained material to be hauled or transported on different modes of transportation.

As contemplated by this invention, a loaded container is hauled on a freight car to a first location, and then transferred to the bed of a truck for further hauling to a suitable place of disposal, at which time the material may be dumped from the container and the container then returned for reuse. The bed of the freight car as well as the bed of the truck are adapted to cooperate with the intermodal container in order to support and securely hold the container in a predetermined position thereon automatically upon lowering of the container into supported position thereon.

Thus, the truck is of the type in which the bed is tiltable by a suitable hydraulic actuator controllable from the cab of the vehicle, and the container has an open end which is closed by a gate, when the bed is in a flat position during transport, and opened, when the bed is tilted, to permit the material to be dumped therefrom. During transport, it's necessary that the gate be latched tightly in its closed position, and then, at the place of disposal, unlatched to permit the gate to swing to its open position when tilted with the bed.

DESCRIPTION OF THE PRIOR ART

In the past, it's been necessary for the operator of the vehicle to leave the cab in order to unlatch the gate, and then, after returning to the cab, tilt the bed. Then, upon returning the bed to a flat position, the operator must again leave the cab in order to relatch the gate before proceeding. This of course is a time consuming procedure, and, in the case of hazardous material, may also be dangerous to the health and well being of the operator. Although many trucks have power operated gates, these would be of no avail when the container is of an intermodel type to be removably mounted on the bed, since the operator would still have to leave and then return to the cab in order to connect the power operators for the gate to the power system of the truck.

It is therefore the primary object of this invention to provide such apparatus which enables the operator to unlatch the gate to dump the material from the tilted container and then return the container to transport position and relatch the gate, without leaving the cab of the vehicle, and, more particularly, which requires only minor modifications to the truck, and, in particular, only the addition thereto of an actuator for operating the latch means.

Another particular object is to provide such apparatus in which latch means is operated in such a manner as to be held in latched position even when the container is off the bed of the truck or upon the loss of force to the actuator, and, more particularly, wherein the latch means includes latching members along both sides and the bottom of the gate and open end of the container which may be moved between latching and unlatching position by the same power actuator.

Another object is to provide apparatus of the type described in the foregoing object in which the gate is locked in latched position, and, more particularly, is automatically unlocked upon initiation of a power cycle to unlatch the gate.

SUMMARY OF THE INVENTION

These and other objects are accomplished, in accordance with the illustrated embodiment of the invention, by apparatus which includes a vehicle having a bed which may be swung between substantially horizontal and inclined positions, and a container of the intermodal type which is adapted to be removably supported in a predetermined position on the bed automatically upon lowering of the container onto the bed. The container has an open end and a gate for swinging between a first position over the open end to close it and a second position which is away from the open end to open it, whereby the gate assumes the closed position when the bed is substantially horizontal and the open position when the bed is tilted so as to permit material to be dumped therethrough. Latch means are mounted on the container for movement between positions holding the gate in its closed position and releasing the gate for swinging to its open position. More particularly, an actuator assembly includes means which is mounted on the vehicle for movement between first and second positions in response to signals from the cab of the vehicle, and operating means on the container has a part which, when the container is so supported on the bed, is positioned to be engaged by the movable means to move the latch means, from its holding to its releasing position, as the movable means is moved from its first to its second position, and to move the latch means from its releasing to its holding position, as the movable means is moved from its second to its first position.

Hence, the operator need not leave the cab as he manipulates suitable controls in order to unlatch the gate prior to tilting of the container with the bed, and then relatch the gate in its closed position when the container is returned with the bed to flat position. Following this, of course, the container may be hauled away with the truck for transfer to a freight car at another location, and another container may be lowered onto the truck bed for dumping another load therefrom.

In the preferred embodiment of the invention, a means mounted on the container for releasably locking the latch means in its holding position is yieldably urged to its locking position. More particularly, the locking means is so positioned, when the container is supported on the vehicle bed, that it is engaged by the movable means to move it to unlocking position as the movable means is moved from first to second position but prior to engagement of the movable means with said operator part to move said latch means toward releasing position.

The movable means has oppositely directed faces and the operating means includes a shaft rotatably mounted on the container and connected to the latch means for moving it between holding and releasing positions in response to rotation of the shaft in opposite directional senses, and a lug which is rotatable with the shaft and when the container is so supported on the bed, is disposed in position to be engaged by the faces as the movable means is moved between its first and second positions. Preferably, the lug and faces on the movable means are so contoured to be substantially tangent to one another as the lug is rotated by engagement with such shoulders, thus transmitting force from the movable means to the lug in the direction of movement of the movable means.

Each latch means comprises a latching member supported by the container for movement in one direction to compress a gasket about the outer open end of the container, as the latching shoulder thereon is forced against a shoulder on the gate to hold it closed, and in a generally opposite direction to move its shoulder away from and to one side of the shoulder on the gate as it is opened. In its preferred and illustrated form, the shaft is connected to the latching member by linkage which is so arranged that the gasket is compressed as an imaginary line through which force is applied to the latching member moves from one side to the other of a pivotal axis of the linkage, whereby the gate is held in closed position despite the loss of force to the actuator. More particularly, there are latching members on each side and along the bottom of the container having shoulders engageable with shoulders on the sides and bottom of the gate, respectively.

BRIEF DESCRIPTION OF THE DRAWINGS

In the drawings, wherein like reference characters are used throughout designated like parts.

DESCRIPTION OF THE PREFERRED EMBODIMENT

Figure 1:
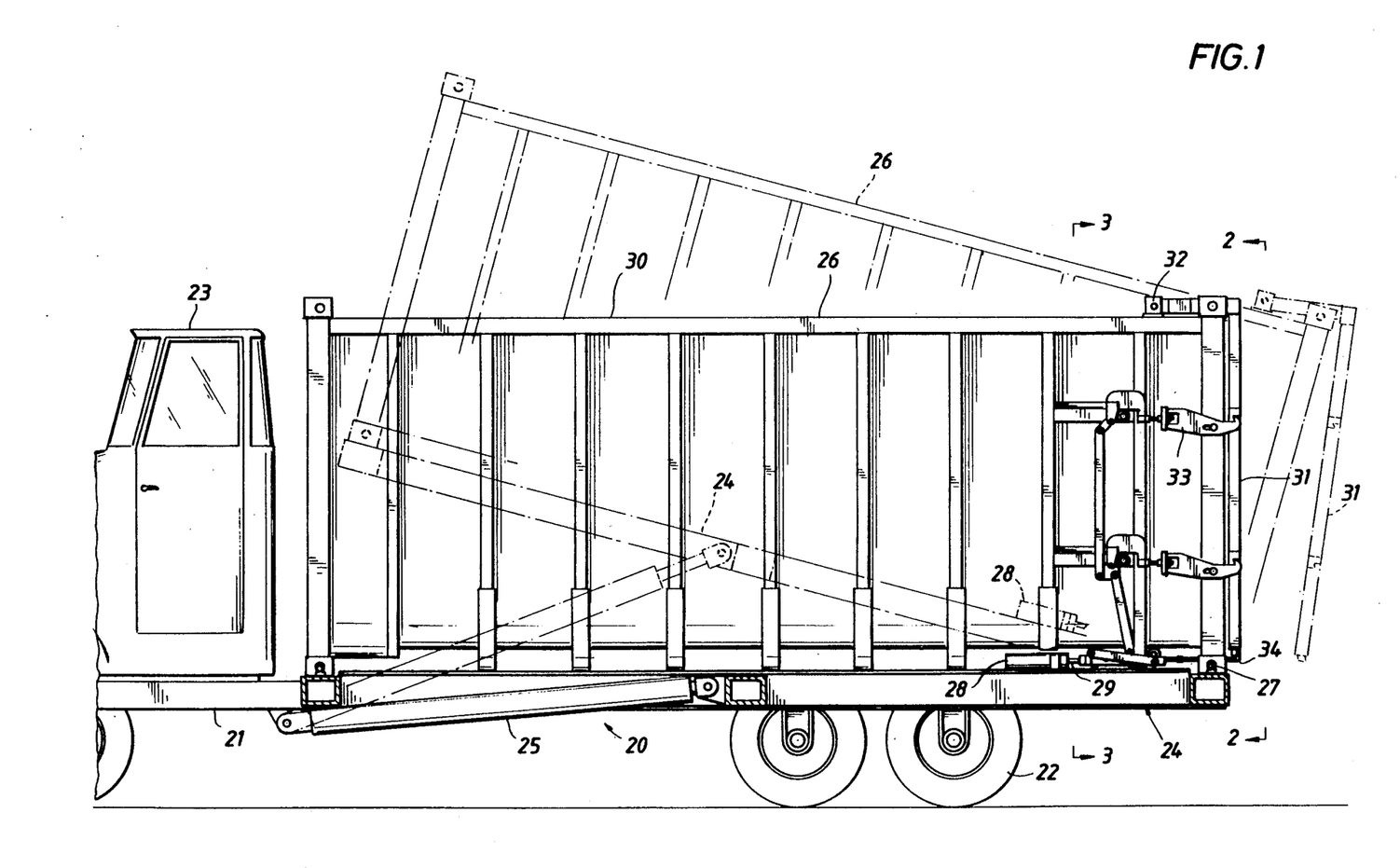
FIG. 1 is a side elevational view of apparatus vehicle constructed in accordance with the present invention and including a vehicle having a bed on which a container is mounted for tilting therewith in the position shown in broken lines.
Figure 2:
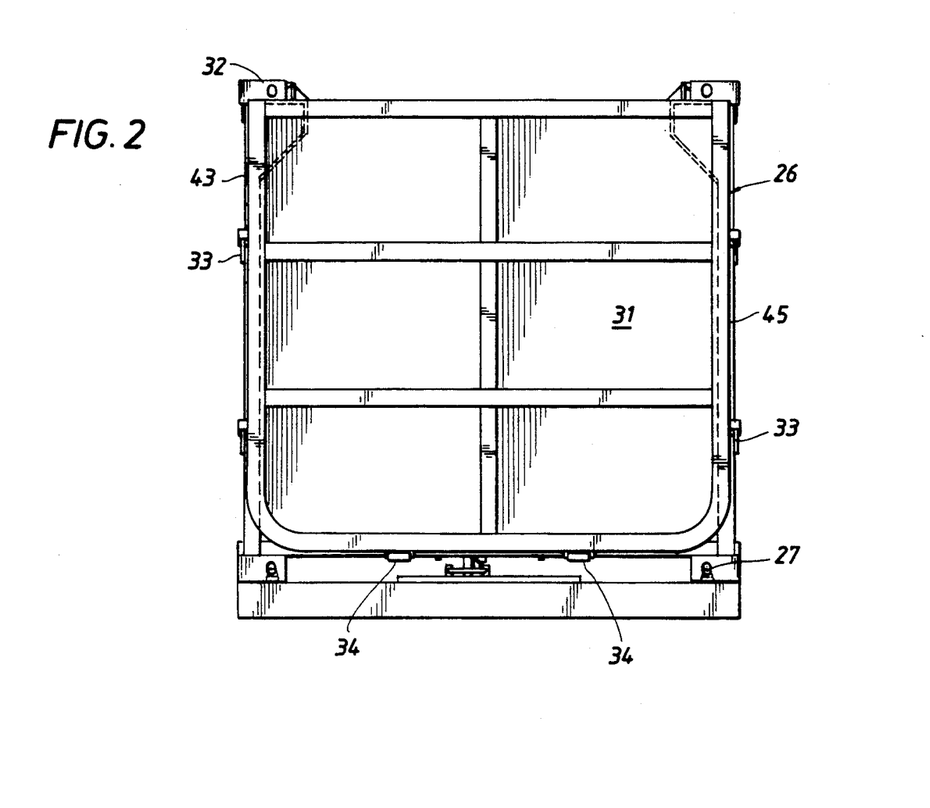
FIG. 2 is a view of the rear end of the vehicle and a gate over the open rear end of the container, as seen along broken lines 2—2 of FIG. 1.
Figure 3:
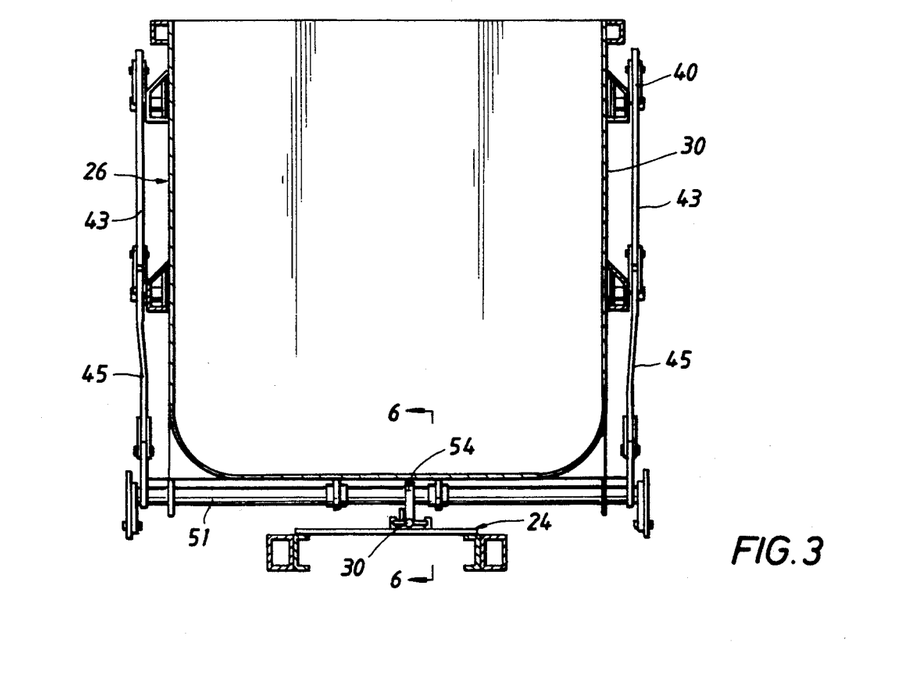
FIG. 3 is a vertical cross sectional view of the vehicle and container, as seen along broken lines 3—3 of FIG. 1.

With reference now to the details of the above described drawings, the vehicle shown in FIG. 1, and indicated in its entirety by reference character 20, is a truck of more or less conventional construction in that it includes a chassis 21 supported by wheels 22 and having a cab 23 on its front end. More particularly, the vehicle has a bed 24 mounted on the chassis of the vehicle rearwardly of the cab 23 for swinging about its rear end between a substantially horizontal position, as seen in solid lines in FIG. 1, and a tilted position as shown in broken lines in FIG. 1. The bed is moved between these positions by means of a hydraulic actuator 25 connected at its opposite ends to the chassis and the bed and adapted to be operated by the driver of the vehicle by suitable controls within the cab 23.

According to the novel aspects of the present invention, the bed of the vehicle is also of such construction as to support a container 26 for tilting with the bed, as shown in broken lines in FIG. 1. More particularly, the container is of the intermodal type which, as well known in the art, has suitable holes at their corners to receive pins 27 at the corresponding corners of the bed, whereby the container is maintained in a predetermined position with respect to the sides and ends of the bed automatically upon being lowered into supported position thereon, as shown in FIG. 1.

In accordance with the present invention, and for a purpose previously mentioned and to be described in detail, the actuator assembly includes a hydraulic actuator 28 and means is mounted on the bed of the vehicle for movement therewith between the substantially horizontal and tilted positions of the bed. The actuator includes of course a cylinder in which rod 29 is reciprocal in response to and from the selective supply and exhaust of hydraulic fluid to opposite sides of the piston on the rod through suitable controls in the cab of the vehicle.

For purposes previously mentioned, the container 26 includes an elongate, substantially "U" shaped portion 30 whose bottom rests upon the top of the vehicle bed, and whose top is open to permit material to be loaded into the container. As previously described, the rear end of the container portion 30 is open, and a gate 31 is pivotally mounted on it for swinging between positions opening and closing its rear open end. Thus, the upper end of the gate is mounted on a hinge 32 in position to be disposed over the open rear end of the container, when the container is substantially horizontal, as shown in solid lines of FIG. 1, whereby it may be latched in closed position as shown in the same figure. On the other hand, when the gate is unlatched and the container is tilted, the gate is free to move to its open position (broken lines in FIG. 1), away from the open end of the container so that material therein may be dumped through the rear of the container.

Figure 4:
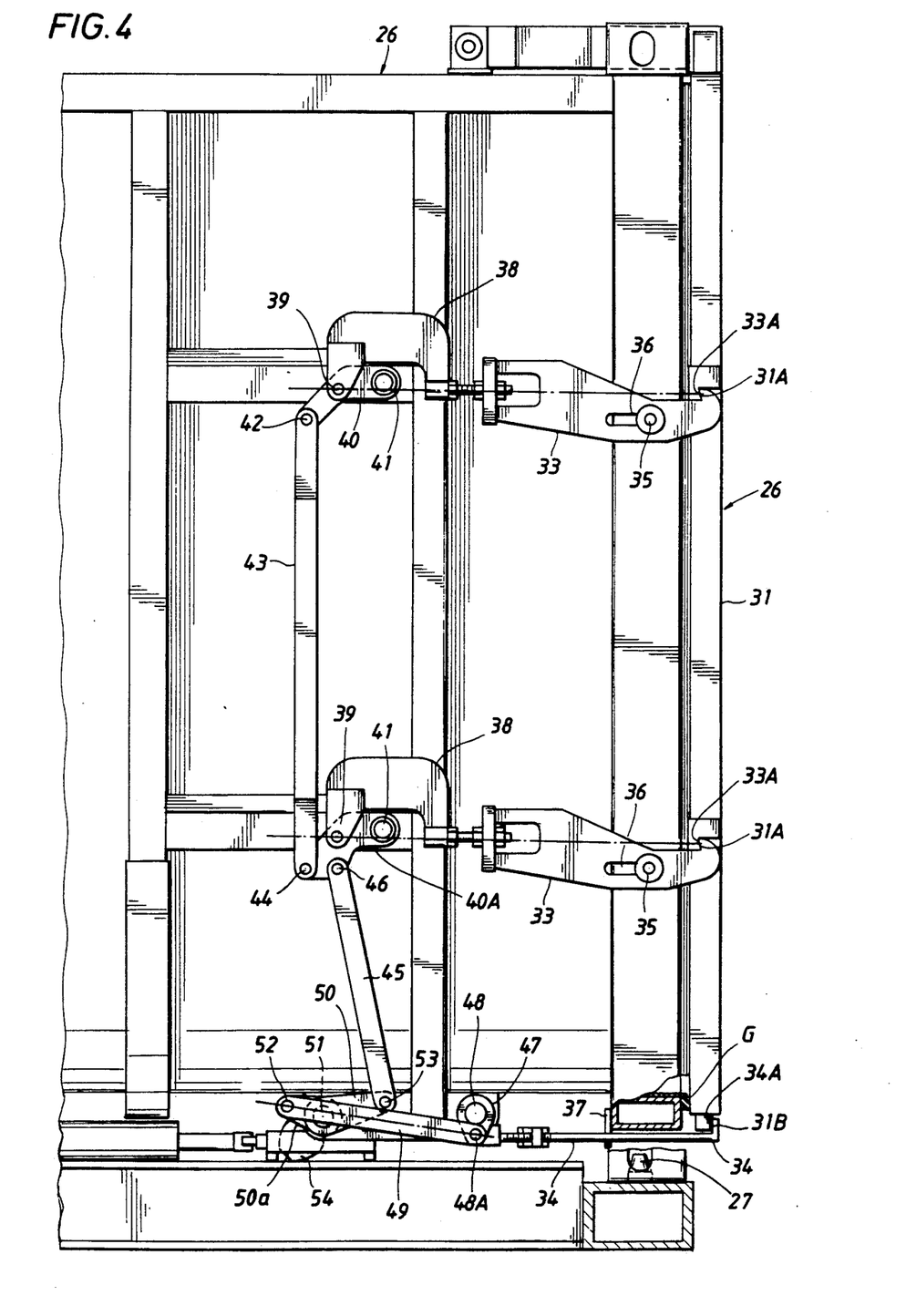
FIG. 4 is an enlarged view of the portion of the side of the vehicle and container and showing latching members in position to hold the gate closed.

As best shown in FIG. 4, the gate is adapted to be latched in its closed position by means of latching members 33 mounted on the sides of the container and latching members 34 supported on the bottom thereof. Thus, the side latching members 33 have forwardly facing shoulders 33A on their outer ends to engage oppositely facing shoulders 31A on the sides of the gate, and the bottom latching members 34 have forwardly facing shoulders 34A which engage rearwardly facing shoulders 31B along the bottom side of the gate. When the latching members are moved forwardly, they force the inner side of the gate against a gasket G (see FIG. 4) mounted about the open rear end of the container so as to compress the gasket and thereby prevent the loss of material from the container when the gate is in its latched position.

In a manner to be described to follow, the latching members 33 and 34 may be moved rearwardly and downwardly with respect to their latching positions to move the latching shoulders of the latching members out of the way of the latching shoulders on the gate so as to permit the gate to swing to its open position when the container is tilted with the vehicle bed.

Each of the latching members 33 comprises a longitudinally extending, vertically disposed plate supported for movement between its latching and unlatching position by means of a pin 35 mounted on the side of the container and extending through a slot 36 in the latching member. Each of the latching members 34, on the other hand, comprises a bar which extends through a hole in a bracket 37 supported on the bottom of the container for movement between its latching and unlatching positions.

The forward end of each of the side latching members 33 is mounted on an inverted "U" shaped member 38 which in turn is pivotally connected by a pin 39 to a crank arm of 40 rotatably mounted at one end on a shaft of 41 extending from the side of the container. The opposite end of the crank arm 40 is in turn pivotally connected at 42 to a substantially vertical link 43 adapted to be raised and lowered in a manner to be described. Thus, as can be seen from a comparison of FIGS. 4 and 5, when the link 43 is raised to the position of FIG. 5, it swings the crank arm 40 in a clockwise direction which in turn moves the outer end of the latching member rearwardly and downwardly to the unlatching position of FIG. 5.

The lower latching member 33 is similar to the upper latching member in that it includes a plate pivotally mounted on pin 35 by means of a slot 36 in the plate. It also includes an inverted "U" shaped member 38 which is pivotally connected to a crank arm 40A which is rotatably mounted on a shaft 41 extending outwardly from the side of the container, but differing from crank arm 40 in that it is pivotally connected by a pin 44 at its opposite end to the lower end of the link 43 and to the upper end of a link 45 by means of a pin 46. As will be understood from FIGS. 4 and 5, the link 45 may be raised from the position of FIG. 4 to the position of FIG. 5 to swing the crank arm 40A in a clockwise direction and thus move the lower latching member 33 to its unlatching position. Concurrently, raising of the link 45 will, through the pivotal connection 44, raise link 43 to move the upper latching member 33 to its unlatching position.

As will be understood from the broken lines on FIG. 4, movement of the crank arms 40 and 40A in a counter clockwise direction to move the side latching members into latching position will compress the gasket as an imaginary line through which force is applied to the latching member moves from one side to the other of the of the pivotal axis of the shafts. Thus, the latching members are held in unlatching position until operation of the actuator 28 to move the latching members to unlatching position, as will be described to follow.

The rearward end of each of the latching members 34 is pivotally connected to a crank arm (not shown) which is rotatably mounted about a shaft 48 supported from and extending laterally beneath the bottom side of the container, and the crank arm is in turn connected at 48A to another crank arm 47 at the outer side of the container. A generally horizontal link 49 is pivotally connected at 48A to the outer crank arm 47 so that upon rearward movement of the link 49 from the position of FIG. 4 to the position of FIG. 5, the crank arms 47 are swung in a counter clockwise direction so as to in turn move the latching member from its latching position to its unlatching position.

The lower end of the link 45 is connected by a pivot pin 53 to the end of an arm 50 rotatably mounted on a shaft 51 also supported from the bottom of the container and extending laterally thereof parallel to the shaft 48, and the forward end of the link 49 is pivotally connected by a pin 52 to the end of another arm 50A rotatably mounted on shaft 51. Thus, when the crank arm is rotated in a counter clockwise direction from the position of FIG. 4 to the position of FIG. 5, it raises the link 45 so as to move the latching members 33 to unlatching position, and moves the link 49 rearwardly so as to move the latching members 34 from latching to unlatching positions.

Figure 5:
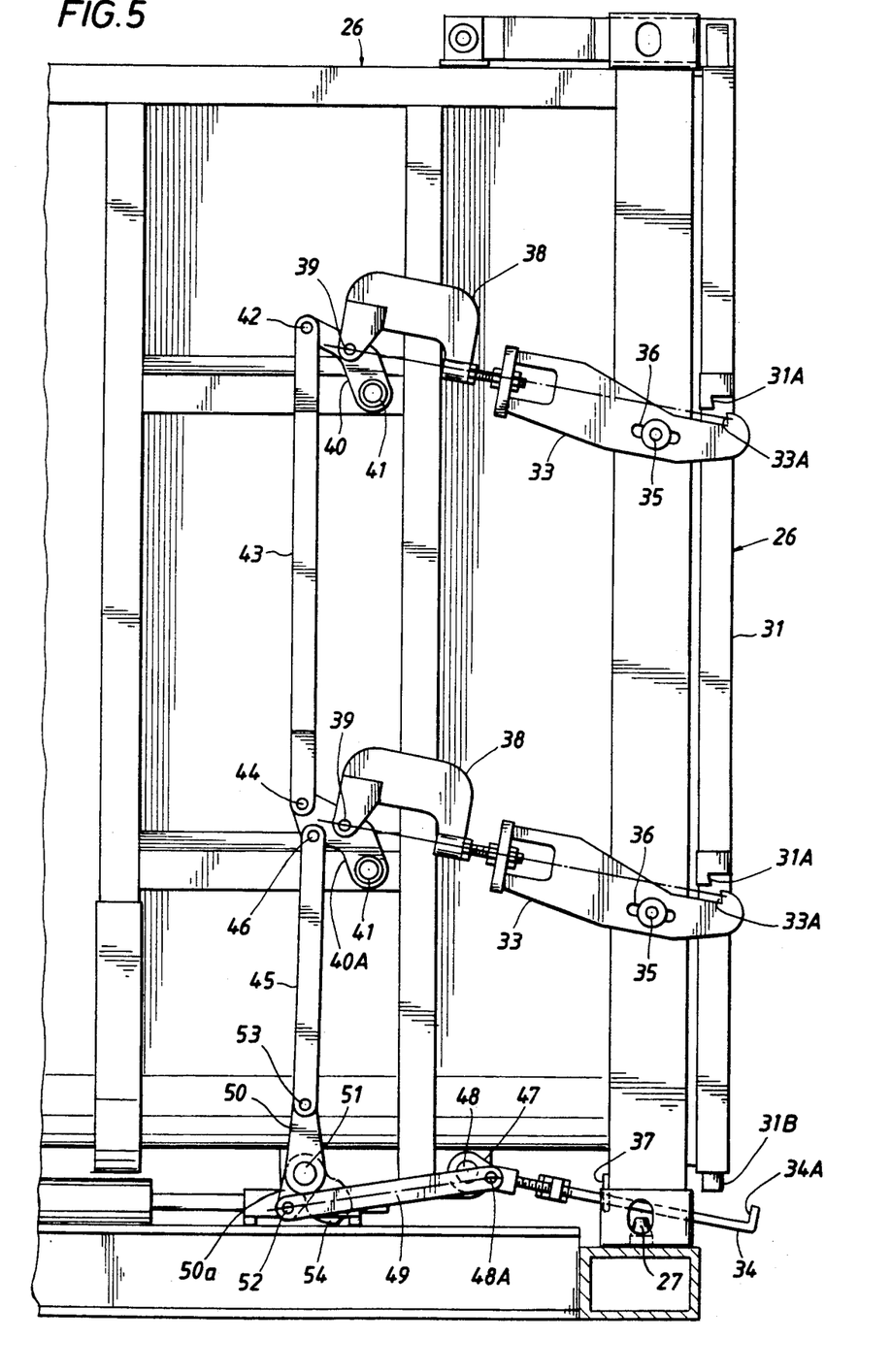
FIG. 5 is another side view of the container, similar to FIG. 4, but showing the latching members moved to releasing positions to permit the gate to be swung to its open position when tilted, as shown by the broken lines in FIG. 1.

As the latching members 34 move from the unlatching position of FIG. 5 to the latching position of FIG. 4, the gasket G is compressed as an imaginary line through which force is applied to the latching member moves from one side to the other of the shaft 51, whereby the lower latching members 34 are held in latching position until such time that the actuator 28 is moved to unlatching position.

As previously described, the latching member operating means includes a lug 54 which is mounted on and rotatable with the shaft 51 such that, when the lug is moved rearwardly from the broken line position of FIG. 4 to the broken line position of FIG. 5, it will swing the crank arm 50 in a counter clockwise direction and move the latching members to unlatching position. Conversely, when the lug is moved forwardly, it swings the crank arm 50 in a clockwise direction so as to move the latching members to latching position, as shown in FIG. 4.

As previously described, and as shown in FIGS. 6 to 11, when the container is lowered to its fixed position on the bed, the lug 54 automatically fits within a slot 55 formed within a bracket 56 mounted on the rearward end of the rod of the actuator 28 for reciprocation therewith. As shown in the aforementioned drawings, the bracket 56 and means is supported on and slidable within a guide on the upper surface of the bed on which the actuator is mounted.

More particularly, the slot 55 of the bracket has a forward face 55A which, when the actuator is extended, moves rearwardly to engage the front of the lug 54 and swing it in a counterclockwise direction to move the latching members to an unlatching position. The slot 55 also has a rear face 55B which, upon contraction of the actuator from the position of FIG. 10 to the position of FIG. 6, will engage the rear of the lug 54 to swing it in a clockwise direction, and thus move the latching members from unlatching to latching position. As shown, the front and rear edges of the lug are contoured so that, as the bracket is moved between its retracted and extended positions, its faces are maintained tangent to the front and rear edges of the lug, thus providing optimum force transmission during all stages of the operation of the latching members.

Figure 6:
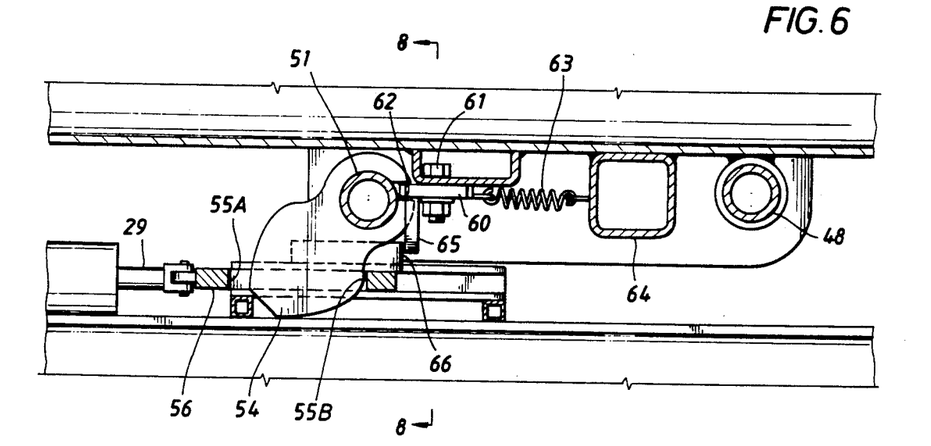
FIG. 6 is a further enlarged vertical sectional view of the container and vehicle bed showing the lug of the operating means disposed between the faces of the actuator assembly movable means on the bed of the vehicle, when the gate is latched in closed position, as shown in FIG. 4.
Figure 7:
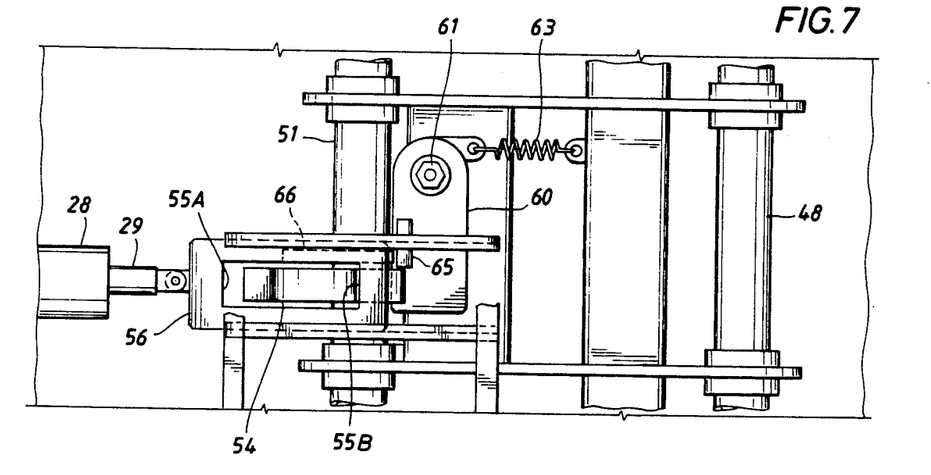
FIG. 7 is a view from the bottom of the bed of the vehicle and container, with the actuator assembly movable means and parts of the operating means in the positions shown in FIG. 6.
Figure 8:
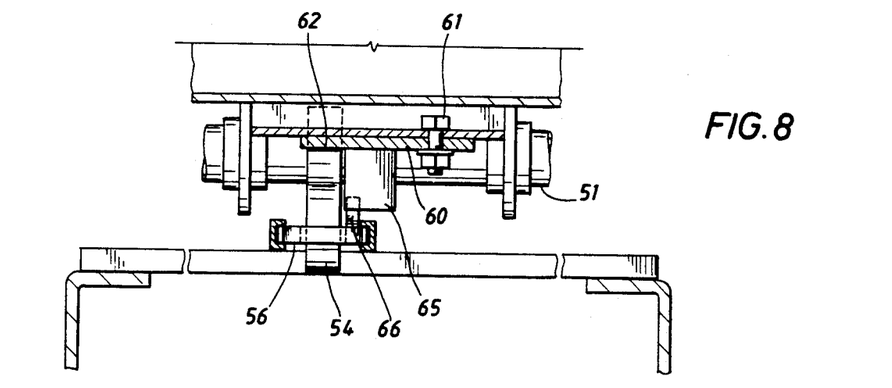
FIG. 8 is a vertical sectional view of the bottom side of the container and operator, as seen along broken lines 8—8 of FIG. 6.
Figure 9:
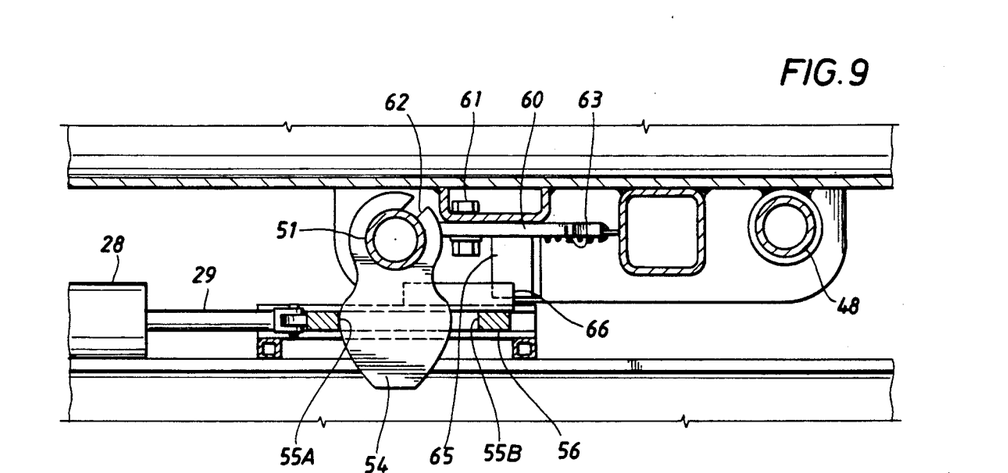
FIG. 9 is a view similar to FIG. 6, but upon initial movement of the actuator assembly movable means in a direction to unlock the locking means and unlatch the latching members.
Figure 10:
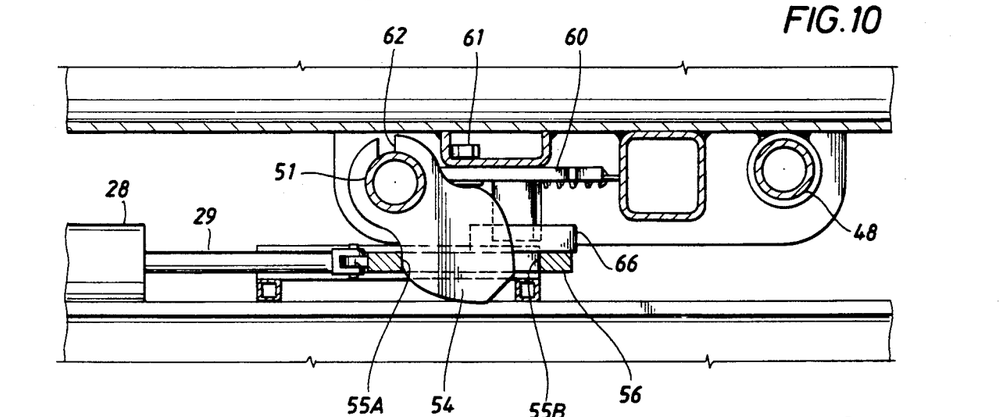
FIG. 10 is a view similar to FIG. 9, but upon further movement of the actuator assembly movable means to swing the lug of the operating means to a position to move the latching members to unlatching position, as shown in FIG. 5.
Figure 11:
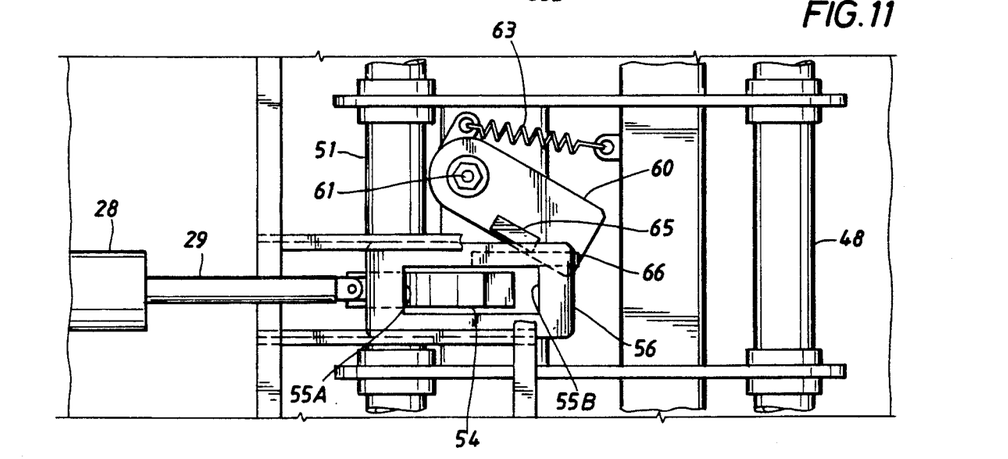
FIG. 11 is a view similar to FIG. 7, but with the parts of the actuator assembly and operating means in the positions of FIG. 10.

As also previously described, a means is provided for releasably locking the lug 54, and thus the operating means for the latching members, against movement from its left hand position to its right hand position for moving the latching members to unlatching position. For this purpose, and as best shown in FIGS. 6-11, a locking part in the form of locking plate 60 is pivotally mounted at 61 to the bottom of the frame for swinging about a vertical axis between a locking position in which it engages in a slot 62 in the lug, as shown in FIGS. 6-8, and a position removed from the slot, as shown in FIGS. 9-11, to release the lug 54 for movement by the actuator assembly in a right hand direction so as to move the latching members to releasing position. More particularly, the locking plate is yieldably urged toward locking position by means of a tension spring 63 where opposite ends are connected between a corner of the locking plate and a square tube 64 mounted on the bottom of the container. Thus, as will be apparent from the drawings, the spring 61 moves the plate into the slot 62 in the lug 54 when the lug is in its left hand position as shown in FIG. 6, thus holding the gate closed when the container is removed from the bed, or when it is on the bed but prior to movement of the actuator to release the gate.

In accordance with a further novel aspect of the present invention, the locking plate 60 includes a vertical leg 65 which extends downwardly from the lower side of the locking plate into a position opposite the front end of the part 66 which is fixed to and movable with the actuator. More particularly, the parts 65 and 66 are so located with respect to one another that the part 66 on the actuator will engage the leg 65 on the locking part to move the locking plate out of the slot 62 before surface 55A on the left hand side of the actuator engages and moves the lug 54 in a counterclockwise direction to unlatch the latching members. Thus, at such time that the lug has been moved to the intermediate position of FIG. 9, and then of course to its right hand position shown in FIG. 10, the locking plate 60 is positively held out of engagement therewith so as to not interfere with the continued travel of the lug from the FIG. 9 to the FIG. 10 position.

On the other hand, upon return movement of the lug from its right hand position to its left hand position in order to return the latching members to latching position, the part 66 permits the part 65 and thus the locking plate 60 to swing in a clockwise direction under the urging of spring 63 until it moves into the notch 62 in the lug 54 as the lug reaches the left hand position of FIG. 6.

Viewing now the overall operation of the apparatus, and assuming that the vehicle has been delivered with a loaded container to the place of disposable, and that the latching members are in latching position to hold the gate closed, as shown in solid lines in FIG. 1, the operator in the cab will first manipulate a suitable control to extend the actuator 28 and thus move the latching members to unlatching position. The operator then manipulates an additional control, while still in the cab of the vehicle, in order to extend the actuator 23 and thus tilt the bed of the truck and the container to the broken line position of FIG. 1. This of course permits the gate to swing to its open position, as also shown in broken lines in FIG. 1, whereby the material in the container is dumped therefrom from its open rear end.

Following dumping of the load, the operator may again manipulate the control for the actuator 23 to return the bed of the truck and thus the container to its substantially level position. At that time, and again without leaving the cab of the vehicle, the operator may manipulate the additional control for the actuator 28 so as to move the lug 54 in a direction to move the latching members to latching position. As previously described, as the latching members are moved to latching position, they press a gasket about the open end of the container and move over dead center position, and by virtue of the linkage of the operating means, the compression of the gasket will hold the latching members in latching position even though force to the actuator 28 is lost. Thus, the latching members could not be moved to unlatching position other than by actuation of the actuator to move the lug and thus the operator to unlatching position.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

We claim:

1. Apparatus for use in hauling and dumping material, comprising:
   a vehicle having a bed which can be tilted between substantially horizontal and inclined positions and a cab,
   a container for holding material, said container having an open end and a gate which swings between a first position covering the open end and a second position away from the open end, said gate occupying the first position when the bed is in the substantially horizontal position and said gate occupying the second position when said bed is tilted into said inclined position to permit the material to be dumped from said container,
   means mounted on said bed and on said container which are cooperable with one another for removably securing said container to said bed in a predetermined position on said bed when said container is lowered onto said bed,
   latch means mounted on said container, said latch means being movable between a position holding said gate in the first position and a position releasing said gate for swinging into said second position,
   an actuator assembly including a means which is mounted on said vehicle to move between first and second positions, and
   operating means mounted on said container, said operating means including a part which is positioned to be engaged by said movable means of said actuator assembly when said container is in said predetermined position on said bed, said part of said operating means moving said latch means from said holding position to said releasing position a said movable means of said actuator assembly is moved from the first position to the second position, said part of said operating means moving said latch means from said releasing position to said holding position as said movable means of said actuator assembly is moved from the second to the first position.

2. Apparatus as defined in claim 1, including
means for releasably locking the latch means in said holding position.

3. Apparatus as defined in claim 2, wherein
said locking means comprises
a locking part mounted on the container for movement between locking and unlocking positions,
and means yieldably urging the locking part toward the locking position when the container is supported in said predetermined position on the vehicle bed, the locking part being engaged by the movable means of the actuator assembly to move the locking part to the unlocking position prior to engagement of the movable means of the actuator assembly with said part on the operating means as said movable means is moved from the first to the second position.

4. Apparatus as defined in claim 1, wherein
said moveable means of the actuator assembly has oppositely facing faces,
said operating means comprises a shaft rotatably mounted on the container and connected to the latch rotatably for moving the latch means between gate holding and releasing positions in response to rotation of the shaft in opposite directional senses, and
said part on the operating means is a lug which is rotatable with the shaft and located between the faces of the movable means of the actuator assembly, when the container is supported in said predetermined position on the bed, in position to be engaged by the faces as the movable means is moved between its first and second positions.

5. Apparatus as defined in claim 4, wherein
the lug is so contoured as to be substantially tangent to the faces on the movable means as the lug is rotated by engagement with such faces.

6. Apparatus for use in hauling and dumping material, comprising:
a vehicle have a bed which can be tilted,
a container for holding material, said container being removably secured to said bed in a predetermined position on said bed when said container is lowered onto said bed, said container having an open end and a gate which swings between a closed position covering the open end when the container is substantially horizontal and an open position removed from the open end when said bed is tilted to permit the material to be unloaded from the container, said container having a bottom side,
latch means movable between a position holding the gate in the closed position and a position releasing the gate for swinging to the open position, and
operating means including
an actuator assembly including a means which is mounted on the bed of the vehicle to move in first and second directions,
a shaft rotatably mounted on the bottom side of the container and connected to the latch means for moving the latch means between the position holding the gate in the closed position in response to rotation of the shaft in one direction and the position releasing the gate for swinging to the open position in response to rotation of the shaft in the opposite direction, and
a lug mounted on the shaft, said lug being engaged by said movable means of said actuator assembly when said container is in said predetermined position on said bed, said movable means engaging the lug and rotating the shaft in one direction when said movable means moves in said first direction and rotating the shaft in the opposite direction when said movable means moves in said second direction.

7. Apparatus as defined in claim 6, wherein the latch means includes at least one latching member on each side of the container.

8. Apparatus as defined in claim 6, wherein the latch means includes at least one latching member on the bottom side of the container.

9. Apparatus as defined in claim 7, wherein the latch means also includes at least one latching member on the bottom side of the container.

10. Apparatus as defined in claim 6, wherein
the container has a gasket surrounding its open end, and said latch means comprises
a latching member having a latching shoulder thereon and supported by the container for movement in one direction to compress the gasket and then force the shoulder on the latching member against a shoulder on the gate, to hold the gate closed, and in a generally opposite direction to move the shoulder on the latching member away form and to one side of the shoulder on the gate to permit the gate to open, and
said operating means includes a linkage having a pivotal axis and connecting the latching member to the shaft and being so arranged that the gasket is compressed as an imaginary line through which force is applied to the latching member moves from one side to the other of said pivotal axis of the linkage and thereby holds the gate closed.

11. Apparatus as defined in claim 10, wherein
there are latching members supported on each side and along the bottom side of the container which have shoulder engageable with shoulders on the sides and bottom of the gate, respectively, and
said shaft connected to the linkage is connected to each latching member.

* * * * *